(12) United States Patent
Ide et al.

(10) Patent No.: US 11,427,220 B2
(45) Date of Patent: Aug. 30, 2022

(54) AUTOMATIC DRIVING VEHICLE

(71) Applicant: TOYOTA JIDOSHA KABUSHIKI KAISHA, Toyota (JP)

(72) Inventors: Hirohito Ide, Nagoya (JP); Yuchi Yamanouchi, Toyota (JP); Kazuhiro Umeda, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 113 days.

(21) Appl. No.: 16/904,957

(22) Filed: Jun. 18, 2020

(65) Prior Publication Data

US 2020/0406919 A1   Dec. 31, 2020

(30) Foreign Application Priority Data

Jun. 28, 2019   (JP) .............................. JP2019-121408

(51) Int. Cl.
  *B60W 60/00*     (2020.01)
  *B60W 50/14*     (2020.01)
  *G01C 21/36*     (2006.01)

(52) U.S. Cl.
  CPC .......... *B60W 60/001* (2020.02); *B60W 50/14* (2013.01); *G01C 21/3605* (2013.01); *B60W 2050/143* (2013.01)

(58) Field of Classification Search
  CPC ............... B60W 60/001; B60W 50/14; B60W 2050/143; G01C 21/3605
  See application file for complete search history.

(56) References Cited

U.S. PATENT DOCUMENTS

| 5,448,479 A | * | 9/1995 | Kemner | .................... B62D 1/28 180/167 |
| 2018/0224852 A1 | * | 8/2018 | Tanahashi | .......... G01C 21/3407 |
| 2019/0103028 A1 | | 4/2019 | Kobayashi et al. | |

FOREIGN PATENT DOCUMENTS

| JP | 2002-53044 A | 2/2002 |
| JP | 2017-182137 A | 10/2017 |

* cited by examiner

*Primary Examiner* — Abby Y Lin
*Assistant Examiner* — Renee LaRose
(74) *Attorney, Agent, or Firm* — Oliff PLC (57) ABSTRACT

An automatic driving vehicle is appropriately fielded into a travel route. Provided is an automatic driving vehicle that is controlled by an operation management center, and has an automatic mode to automatically travel along a set travel route. An input to shift to the automatic mode is performed by an operator, a travel start instruction is received from the operation management center, a state of waiting for a start manipulation by the operator is provided, and in the start manipulation waiting state, in a case where the start manipulation is performed and a case where the start manipulation is not performed and a predetermined time elapses, start is performed to start travel in the automatic mode.

6 Claims, 7 Drawing Sheets

AUTOMATIC DRIVING VEHICLE

CROSS REFERENCE TO RELATED APPLICATION

The entire disclosure of Japanese Patent Application No. 2019-121408 filed on Jun. 28, 2019 including the specification, claims, drawings, and abstract is incorporated herein by reference in its entirety.

TECHNICAL FIELD

The present disclosure relates to an automatic driving vehicle that automatically travels in accordance with an instruction from an operation management center.

BACKGROUND

Heretofore, there have been various suggestions as to automatic driving of a vehicle. In JP 2002-053044 A (Patent Literatures 1), there is disclosed a system in which an automatic driving vehicle automatically travels along a predetermined course while stopping at respective stations. In this system, a traffic control center controls arrival and departure of the automatic traveling vehicle at each station based on a standard timetable. In particular, departure time and scheduled arrival time at the next station are transmitted to the automatic traveling vehicle to determine a travel pattern between the stations, so that a vehicle operation can be managed without changing the standard timetable. Furthermore, in JP 2017-182137 A (Patent Literatures 2), there is disclosed a system to control operation of a bus in response to a user's request. That is, an operation management center prepares an operation plan indicating when and where the bus travels in response to the user's request, and this plan is transmitted to the bus, so that the bus travels based on the operation plan.

In systems described in Patent Literatures 1 and 2, a center determines an operation schedule of an automatic driving vehicle, to control automatic driving of the vehicle. Here, in a case of operating a plurality of automatic driving vehicles, it becomes a problem as to how to put the automatic driving vehicle into service on a travel route. Particularly, in case of using an electrically-powered automatic driving vehicle, the automatic driving vehicle has to be periodically removed from service or put into service on the travel route for the purpose of charging a battery, and control in this case becomes a problem.

SUMMARY

According to the present disclosure, in an automatic driving vehicle that is controlled by an operation management center, and has an automatic mode to automatically travel along a set travel route, an input to shift to the automatic mode is performed by an operator, a travel start instruction is received from the operation management center, a start manipulation waiting state of waiting for a start manipulation by the operator is provided, and in the start manipulation waiting state, in a case where the start manipulation is performed and a case where the start manipulation is not performed and a predetermined time elapses, start is performed to start travel in the automatic mode.

In the start manipulation waiting state, a stop holding state is provided, and in case of performing the start, the stop holding state may be automatically canceled to perform the start.

In a case where the travel start instruction is received, information that the automatic vehicle is at a start manipulation waiting state may be informed to the operator.

At the start, a horn may be sounded.

According to the present disclosure, also in a case where an operator does not perform any start manipulation, a vehicle can automatically perform start. Particularly, an input is performed by the operator, and then automatic start is performed, so that safety can be improved.

BRIEF DESCRIPTION OF DRAWINGS

An embodiment of the present disclosure will be described based on the following figures, wherein.

DESCRIPTION OF EMBODIMENT

Hereinafter, an embodiment of the present disclosure will be described with reference to the drawings. Note that the present disclosure is not limited to the embodiment described herein.

[Vehicle Operation System Entire Configuration]

Figure 1:
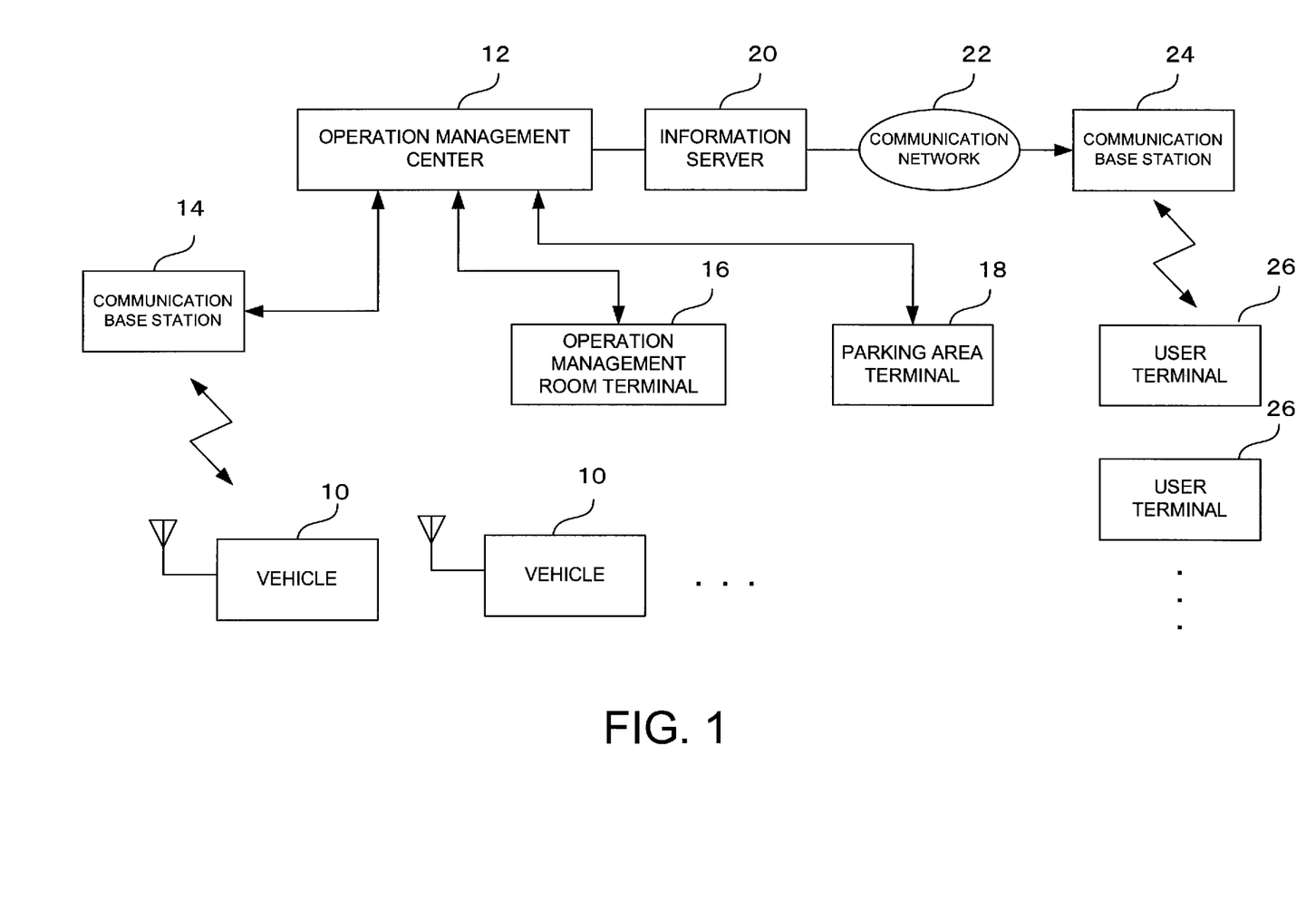
FIG. 1 is a block diagram showing an entire configuration of a vehicle operation system that operates an automatic driving vehicle.

FIG. 1 is a block diagram showing an overall configuration of a vehicle operation system that operates an automatic driving vehicle. In this system, a plurality of automatic driving vehicles (vehicles) 10 operate along a predetermined travel route. Each of the vehicles 10 is, for example, a passenger bus to be operated on a determined route, and makes rounds of certain areas while stopping at stopping places such as bus stops.

An operation management center 12 includes a computer having a communicating function, and manages operation of the vehicles 10. That is, an operation plan of a plurality of vehicles 10 that includes putting into service (going into the determined rout) and removing from service (going out from the determined rout) of the vehicles 10 is prepared and stored. This operation plan includes an operation schedule indicating when and where the respective vehicles 10 travel (e.g., estimated (scheduled) time to arrive at a predetermined location). For example, the respective vehicles 10 will arrive at the predetermined location every 15 minutes if the vehicles travel at 20 km/h and distance between two vehicles 10 is 5 km. The operation management center 12 always grasps the location of each of the vehicles 10, and updates the operation schedule of each vehicle 10 to transmit the schedule to the corresponding vehicle 10 as needed. Each vehicle 10 controls travel (acceleration and deceleration) to arrive at the predetermined location at the estimated arrival time in accordance with the transmitted operation schedule. Thus, the operation schedule transmitted from the operation management center 12 to the vehicle 10 includes at least a command for travel speed, including the estimated arrival time for the vehicle 10 to arrive at the predetermined location. Furthermore, the operation management center 12 can automatically prepare a corresponding plan in case of emergency, such as failure of the vehicle 10.

The operation management center 12 is connected to a plurality of communication base stations 14, and the plurality of communication base stations 14 are connected to the plurality of vehicles 10 via wireless communication. Therefore, the vehicle 10 can travel in accordance with the command from the operation management center 12 while exchanging information with the operation management center 12 through the communication.

The operation management center 12 is connected to an operation management room terminal 16, and the operation management room terminal 16 accepts inputs of the necessary command or data in the operation management center 12, and provides a system operator with information by use of a display or the like.

The operation management center 12 is connected to a parking area terminal 18. The parking area terminal 18 is provided in a parking area where the offline vehicle 10 that does not automatically travel is parked, and through the terminal, necessary information associated with the parking area is input and output. In the parking area, a charging facility is provided, and a battery to be mounted in the vehicle 10 can be charged if necessary.

The operation management center 12 is connected to an information server 20. The information server 20 provides a user with operation information of the vehicle 10. The information server 20 is connected to a communication base station 24 via a communication network 22, and the communication base station 24 is connected to user terminals 26 via wireless communication. Each of the user terminals 26 may be a portable terminal such as a smartphone, and the user who gets in the vehicle 10 checks an operating situation of the vehicle 10. Note that a terminal is also provided at each stopping place, and information on the vehicle 10 that arrives at the stopping place next is displayed.

[Configuration of Vehicle]

Figure 2:
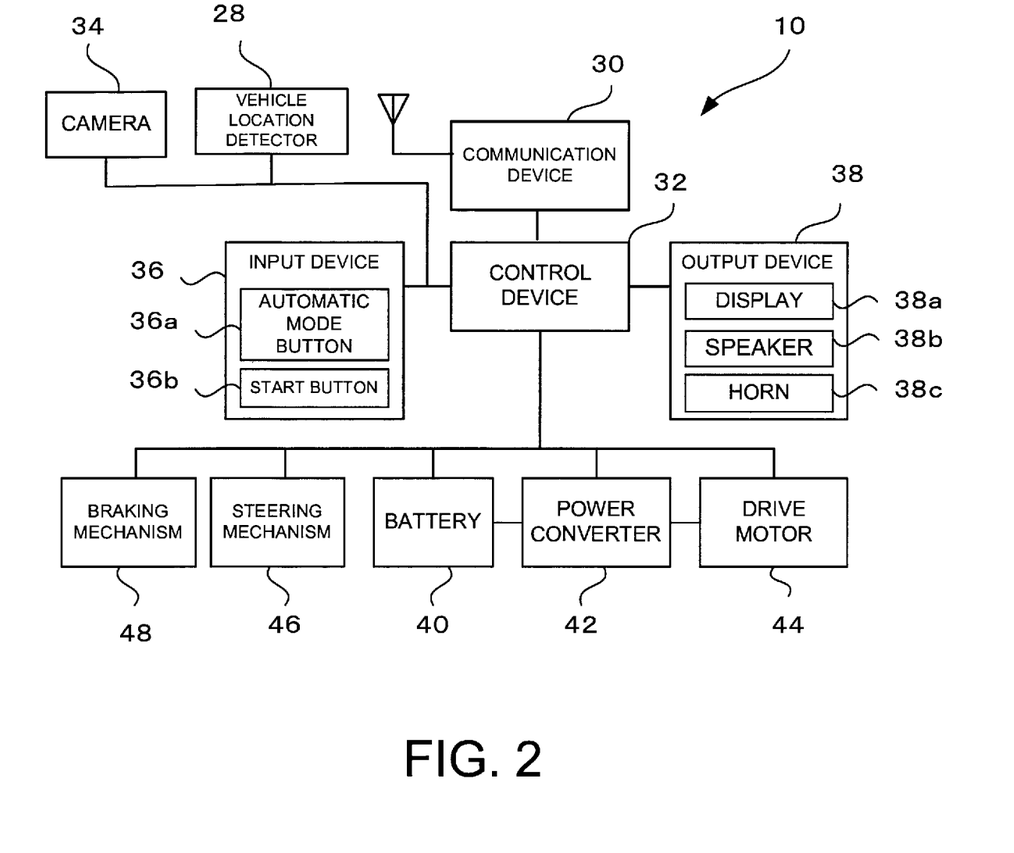
FIG. 2 is a block diagram showing a configuration of a vehicle 10 that automatically drives.

FIG. 2 is a block diagram showing a configuration of the vehicle 10 that has an automatic mode to automatically drive in accordance with an instruction from the operation management center 12, and that automatically drives. A communication device 30 wirelessly communicates with the communication base station 14, to transmit and receive various types of information. The communication device 30 is connected to a control device 32, and the information to be transmitted and received in the communication device 30 is processed by the control device 32. The control device 32 controls overall operation, including the travel of the vehicle 10.

The control device 32 is connected to a vehicle location detector 28, a camera 34, and an input device 36 that accepts input of data, and a vehicle location (present location) detected by the vehicle location detector 28, an image around the vehicle 10 that is captured in the camera 34, a travel command that is input from the input device 36 and the like are supplied to the control device 32. The vehicle location detector 28 includes a GPS device or the like and a gyroscope, and detects vehicle location information as needed, also by use of location information from beacons along the travel route, a transmitter of the stopping place or the like. The detected vehicle location, the captured peripheral image and others are appropriately supplied to the operation management center 12. The input device 36 includes an automatic mode button 36*a* for shifting to the automatic mode, a start button 36*b* to command start of the vehicle 10 at the stopping place or the like, and a mechanical manipulating part 36*c* to be manipulated by the operator. Furthermore, the control device 32 is connected to an output device 38 including a display 38*a*, a speaker 38*b*, and a horn 38*c*, from which necessary information is output.

Furthermore, in the vehicle 10, a battery 40, a power converter (for example, inverter) 42 and a drive motor 44 are mounted, and DC power from the battery 40 is converted to desired AC power by the power converter 42 and supplied to the drive motor 44. Consequently, the drive motor 44 is driven, and wheels are rotated by output of the motor, so that the vehicle 10 travels. Furthermore, a steering mechanism 46 controls steering of the vehicle 10. Additionally, a braking mechanism 48 controls deceleration and stopping of the vehicle. The power converter 42, the steering mechanism 46 and the braking mechanism 48 are connected to the control device 32, and the control device 32 controls travel of the vehicle 10. Note that the power converter 42 is controlled, to perform regenerative braking of the drive motor 44. Note that the control device stores information on the travel route, and enables autonomous travel based on the vehicle location, camera information or the like.

[Travel Route]

Figure 3:
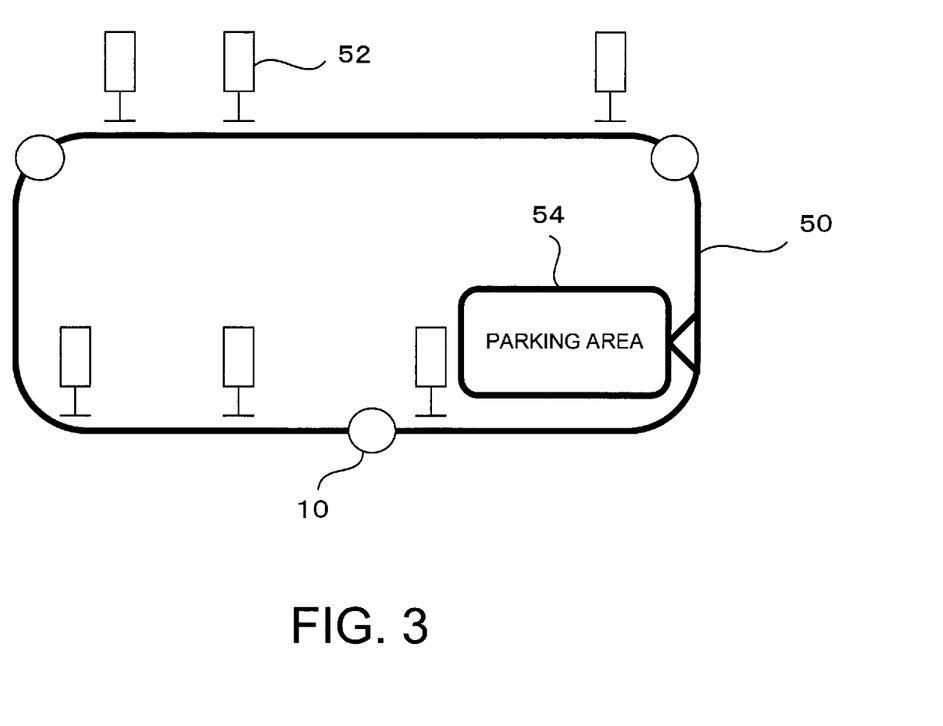
FIG. 3 is a diagram schematically showing an example of a travel route of the vehicle 10.

FIG. 3 is a diagram schematically showing an example of the travel route of the vehicle 10. In this example, a travel route 50 is a circuit route, and three vehicles 10 operate via an almost equal distances apart. Stopping places 52 are installed at appropriate intervals in accordance with uses of passengers. For example, one of the stopping places 52 is a transfer stopping place to a separate bus stop or a train station, or another stopping place is close to certain passenger's home. Furthermore, one place (an entrance passage and an exit passage) of the travel route 50 is connected to a parking area 54, and the vehicle 10 is put into service from the parking area 54 to the travel route 50 or removed (bounced) from the travel route 50 to the parking area 54.

Note that FIG. 3 schematically shows the travel route 50, and an actual travel route 50 is not such a simple route, and includes, for example, an intersection or a turning point. Furthermore, turning (turnaround) travel at a predetermined turning point may be autonomously performed. A turning program that defines how to turn at the predetermined turning place is stored in the control device 32, and the turning travel is performed by executing the turning program.

[Operation Control]

The operation of the plurality of vehicles 10 are basically managed by the operation management center 12. Consequently, for a vehicle 10 that is operable, vehicle information is stored together with an identification number of the vehicle in the operation management center 12. Furthermore, in the operation management center 12, the operation plan drafted using the operation management room terminal 16 or the like in advance is stored. That is, for example, putting a predetermined number of vehicles 10 into service on the travel route 50 one by one to start the operation is scheduled, and in a case where a vehicle 10 requires charging, removing the vehicle 10 from the service and putting a vehicle 10 on standby into the service is scheduled.

Furthermore, in the operation, the vehicles 10 are controlled to travel basically with equal distance apart. That is, each of the vehicles 10 provides the operation management center 12 with the information on the vehicle location as needed, and the operation management center 12 updates individual operation schedules so that the time difference between one vehicle to the next vehicle is always same at each stopping place, as needed, and transmits each of the schedules to each vehicle 10. Then, a vehicle speed (acceleration and deceleration) and the like of the vehicle 10 are controlled in accordance with the operation schedule sent from the operation management center 12. Furthermore, the number of the vehicles 10 to be operated is determined by the operation management center 12, and the vehicle 10 is automatically put in service or removed from the service in accordance with the instruction from the operation management center 12. Note that information on a battery residual capacity is also periodically supplied from the vehicle 10 to the operation management center 12, and a vehicle 10 having a battery residual capacity below a set value is automatically replaced with the charged vehicle 10.

Here, in the operation management room terminal 16, a large display may be prepared, to display a present location of each of the vehicles 10 on the travel route, and an estimated location after elapse of a predetermined time, so that an entire operating situation may be grasped.

[Parking Area Operation]

Figure 4:
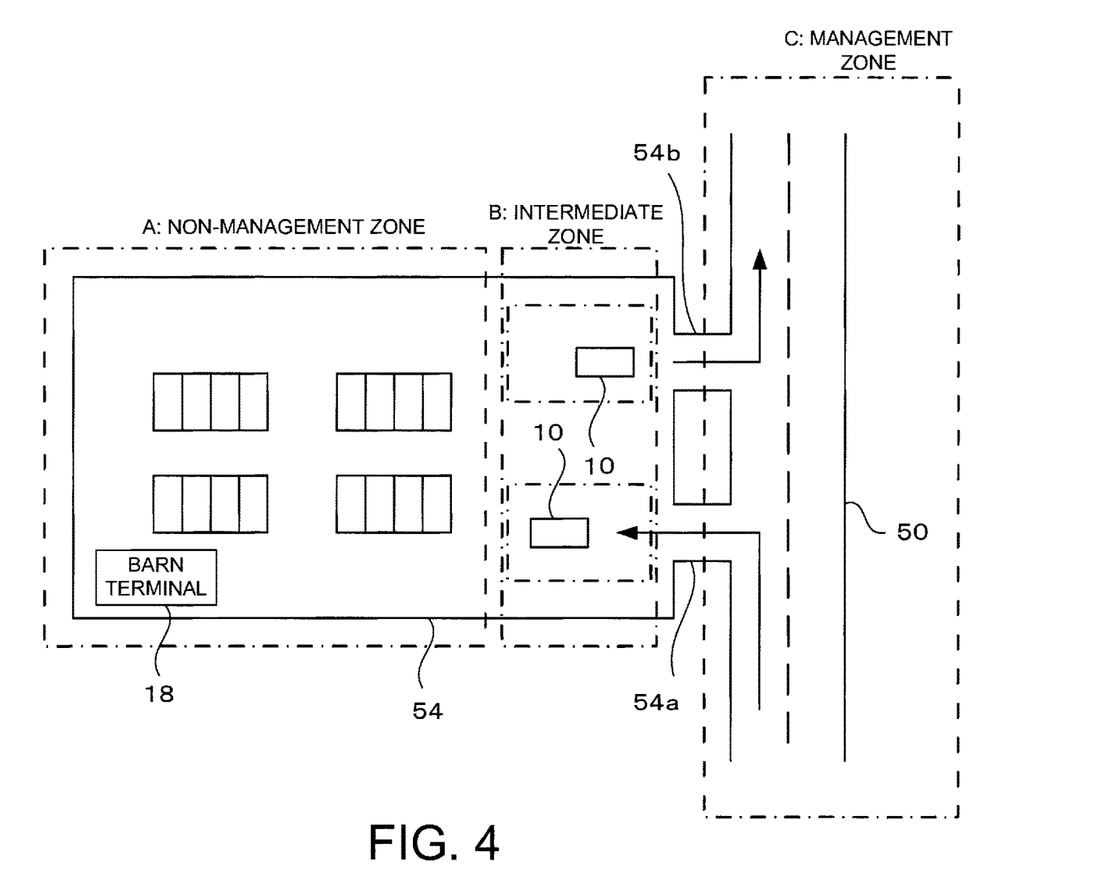
FIG. 4 is a diagram showing a configuration example of a parking area.

FIG. 4 is a diagram showing a configuration example of a parking area. The parking area 54 includes an out of service zone A and an intermediate zone B. Note that the travel route 50 is in-service zone C. The out of service zone A is a space that accommodates the offline vehicle 10 out of service. Note that in the out of service zone A, the vehicle 10 can be charged, and the vehicle 10 is manually driven. The parking area terminal 18 provides the operation management center 12 with a number of vehicles 10 and a vehicle situation such as a charged situation in the out of service zone A, and the operation management center 12 grasps the number of the vehicles 10 to be put into service in the automatic driving, or the like.

The intermediate zone B is located between the travel route 50 and the out of service zone A, and the vehicles 10 on standby for being put into service and the vehicles 10 for removal from service are arranged. This example indicates one vehicle 10 on standby for being put into service at a position that faces an into-service path toward the travel route 50, and one vehicle 10 on standby for removal from service at a position that faces an exit path from the travel route 50. The vehicle 10 of the out of service zone A is manually moved to a position on standby for being put into service, and enters to an in-service standby state. Furthermore, the vehicle 10 that leaves the travel route 50 is moved to a standby position in the intermediate zone B via an exit path, and stops at the standby position. Consequently, the automatic driving of the vehicle 10 ends, and the vehicle is then manually moved to the out of service zone A.

[In-Service Control]

The vehicle 10 that may be put into service first communicates with the operation management center 12. In a case where the vehicle 10 does not have any problems, the vehicle 10 is registered in an identification completed vehicle list in the operation management center 12. For example, for a vehicle 10 in the parking area 54, a mechanic or the like performs inspection and maintenance, and confirms whether the vehicle can shift to the automatic mode. Furthermore, for a vehicle that can be prepared for shifting to the automatic mode, it is displayed on the display 38a that the vehicle can shift to the automatic mode.

The operation management center 12 transmits an into service instruction to the parking area terminal 18 at the time of putting a new vehicle into service. Note that in the parking area terminal 18, an in-service plan may be stored in advance, and putting vehicles into service may be confirmed from the parking area terminal to the operation management center 12.

In the parking area 54, an operator manually moves a vehicle 10 that can be fielded, to the standby position, and displays to the effect that the vehicle can shift to the automatic mode. For a vehicle 10 that is stopped at the standby position (an in-service standby vehicle), the operator depresses the automatic mode button 36a of the input device 36 to start in-service processing of the vehicle 10.

Figure 5:
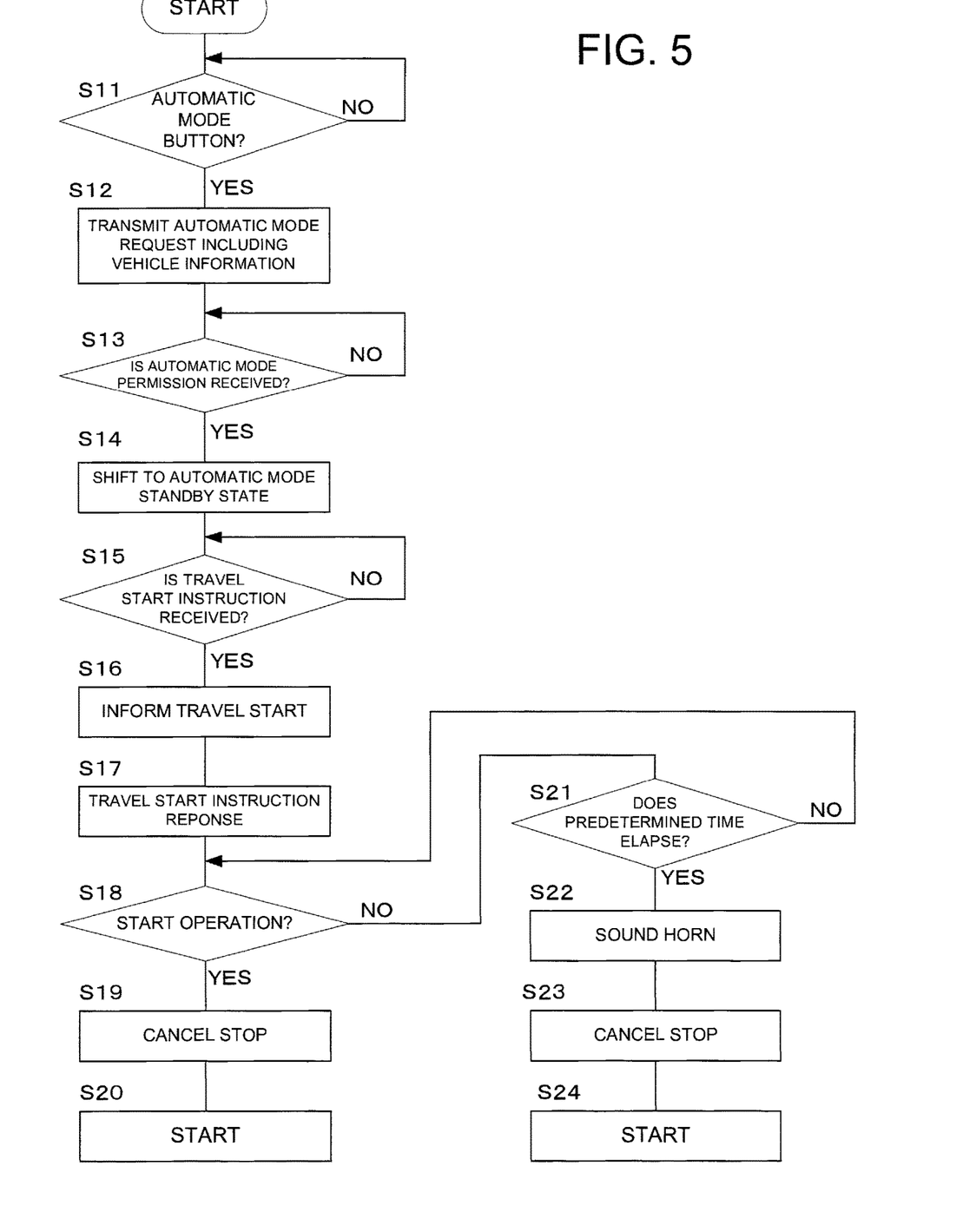
FIG. 5 is a flowchart showing processing when putting the vehicle 10 into service.

FIG. 5 is a flowchart showing processing when putting the vehicle 10 into service. The vehicle 10 located at the in-service standby position determines whether the automatic mode button 36a is depressed (S11), and if YES in this determination, the vehicle transmits an automatic mode request and vehicle information to the operation management center 12 (S12). Thus, when the vehicle 10 is put into service on the travel route 50 as the automatic driving vehicle, an operator's task of depressing the automatic mode button 36a is required, and this is notified to the operation management center 12. Consequently, it is confirmed in the operation management center 12 that the operator recognizes the vehicle being put into service. In place of the depression of the automatic mode button 36a, for example, voice input of "automatic driving start" or the like by the operator may be adopted. Here, the automatic mode request is to transmit notification of completion of preparation for putting the vehicle 10 into service, and is automatically transmitted in response to the depressed automatic mode button 36a. Furthermore, the vehicle information is also transmitted to the operation management center 12 together with the automatic mode request. The vehicle information includes an identification number of the vehicle, information on specifications of the vehicle (a model code), and a state of the vehicle such as a battery residual capacity.

The operation management center 12 confirms, based on the vehicle information, whether the vehicle 10 is a vehicle that matches an operation plan, that is, whether the vehicle 10 is an identified and listed vehicle that is instructed to be put into service, and if OK, the center transmits an automatic mode permission.

The vehicle 10 enters a permission waiting state after the automatic mode request is transmitted, and determines whether the automatic mode permission can be received (S13). Then, in a case where the automatic mode permission from the operation management center 12 is received, the vehicle shifts to an automatic mode standby state (S14).

When shifting to the automatic mode standby state, the vehicle determines whether a travel start instruction from the operation management center 12 is received (S15). The operation management center 12 manages an operation of the plurality of vehicles 10, on the assumption that the vehicles arrives a stop place at a same interval. Therefore, the time of putting the new vehicle 10 into service also may fall in a predetermined range. For this purpose, the center transmits the travel start instruction at an appropriate time. The travel start instruction may include travel start time.

In a case where the travel start instruction is received in S15, notification of start of automatic travel is output from the speaker 38b, to inform the operator (S16). Furthermore, when informing, sounding of the horn 38c, flashing of a lamp, notification by voice or the like can be adopted, and voice output of "The automatic travel will start. Please push the start button." or the like may be adopted. Note that, for example, in a case where abnormality occurs at this stage and the automatic travel is impossible, putting the vehicle 10 into service is discontinued and error processing is performed.

In S16, the informing in the vehicle 10 is transmitted to the operation management center 12 together with a start instruction response indicating that travel start is possible (S17), and the vehicle enters a state of waiting for an operator's start manipulation while keeping the vehicle 10 in a stopped state. Here, this start instruction response may be automatically transmitted, or transmitted in response to operator's confirmation input. That is, the operator performs a manipulation such as the confirmation input for the informing or the transmission to the operation management center 12, so that the operator can perform safety confirmation, and safety in subsequent starting can be ensured.

Next, it is determined whether there is the start manipulation by the operator in the state of waiting for the start manipulation (S18). Then, in a case where there is the start manipulation, a stop holding state is canceled (S19), and starting is performed (S20). Consequently, the vehicle 10 travels as the automatic driving vehicle along the travel route 50 in the automatic mode. Note that the start operation may be performed, for example, by depressing the start button 36b provided as one element of the input device 36 in the vehicle 10.

If NO in the determination of S18, it is determined whether a predetermined time has elapsed (S21). That is, a time from when the vehicle 10 receives the travel start instruction is measured for determining whether the predetermined time has elapsed. If NO in this determination, the processing returns to S18. If YES in the determination of S21, the horn 38c is sounded (S22), and the stop holding state is then canceled (S23), and then the vehicle 10 starts (S24).

Thus, in the case where the travel start instruction is received from the operation management center 12 and operation start is informed, the vehicle is considered to be ready to start traveling. Consequently, in a case where there is no start manipulation by the operator within a predetermined time, the vehicle automatically starts, so that the in-service timing can be appropriately maintained. Furthermore, an occupants and people in the surrounding of the vehicle 10 can be informed of the start, for example, by sounding the horn 38c. Voice announcement of "the vehicle will start" may be output. Note that in a case where the travel start instruction is not received from the operation management center 12 and the operation start is not informed, starting without any start manipulation by the operator is prohibited.

Note that such processing during such putting into service cannot necessarily applied be only to putting vehicles into service from the parking area, but can also be applied when putting a vehicle 10 that has the automatic mode canceled, for example, due to emergency stop, into service.

[Automatic Travel]

The operation management center 12 transmits the predetermined operation schedule of each vehicle 10 to control its traveling. The operation management center 12 always grasps the location of each vehicle 10 to update the operation schedule as needed, the operation schedule includes an instruction for acceleration and deceleration (the travel speed of the vehicle 10) so that each vehicle 10 basically arrives at each stopping place at same intervals. Note that the operation management center 12 provides the vehicle 10 with information on a location of the other vehicle 10, so that an operator of the vehicle 10 can know the operating situation of the other vehicle and provide the user with the information. Here, the operator of the vehicle 10 has to be an occupant who manipulates the vehicle 10, and the operator may be an occupant intended for vehicle manipulation, or a passenger who gets on the vehicle to reach a destination.

Note that in this example, the steering is autonomously controlled in the automatic mode.

When approaching the stopping place, vehicle stop control is entered at a predetermined location, to stop at the stopping place. After the stop, doors automatically open, and the occupants get on and off. When the vehicle definitely stops at all the stopping places, it is not necessary to take into consideration a stop request or the like from the occupant, but the vehicle may stop in response to the stop request.

After the vehicle stops, the vehicle releases the stop depending on operator's start manipulation, and enters start control to start. At this point, the vehicle 10 autonomously stops and starts at the stopping place. Afterward, the vehicle automatically travels in response to the instruction from the operation management center 12.

[Control at Stopping Place]

Figure 6:
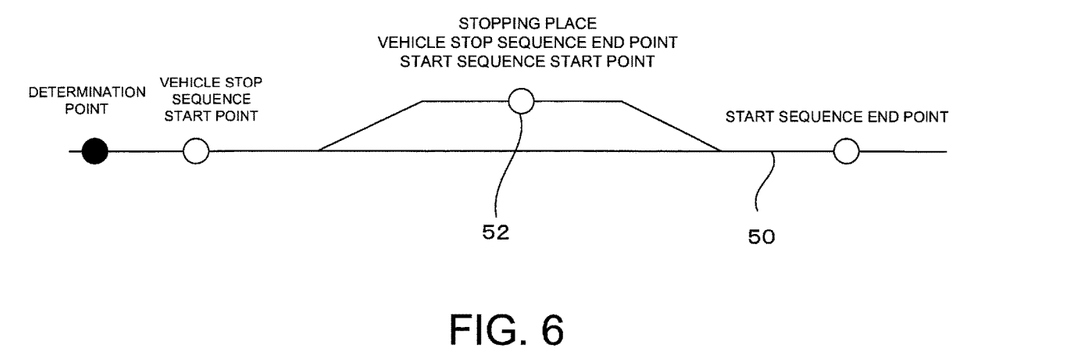
FIG. 6 is a schematic view around a stopping place 52.

FIG. 6 is a schematic view around the stopping place 52. Thus, a vehicle stop/pass determination point to determine whether the vehicle stops or passes at the stopping place 52 is set at a predetermined distance before the stopping place 52. Then, a vehicle stop sequence start point to stop the vehicle at the stopping place 52 is set at a position that is closer to the stopping place 52 than this determination point is, and a start sequence end point to start from the stopping place 52 is set at a predetermined distance ahead of the stopping place 52. The stopping place 52 is a vehicle stop sequence end point and a start sequence start point. In this example, in a section between the vehicle stop sequence start point and the start sequence end point in the automatic mode, the instruction from the operation management center 12 is ignored, and the vehicle 10 autonomously travels.

Figure 7:
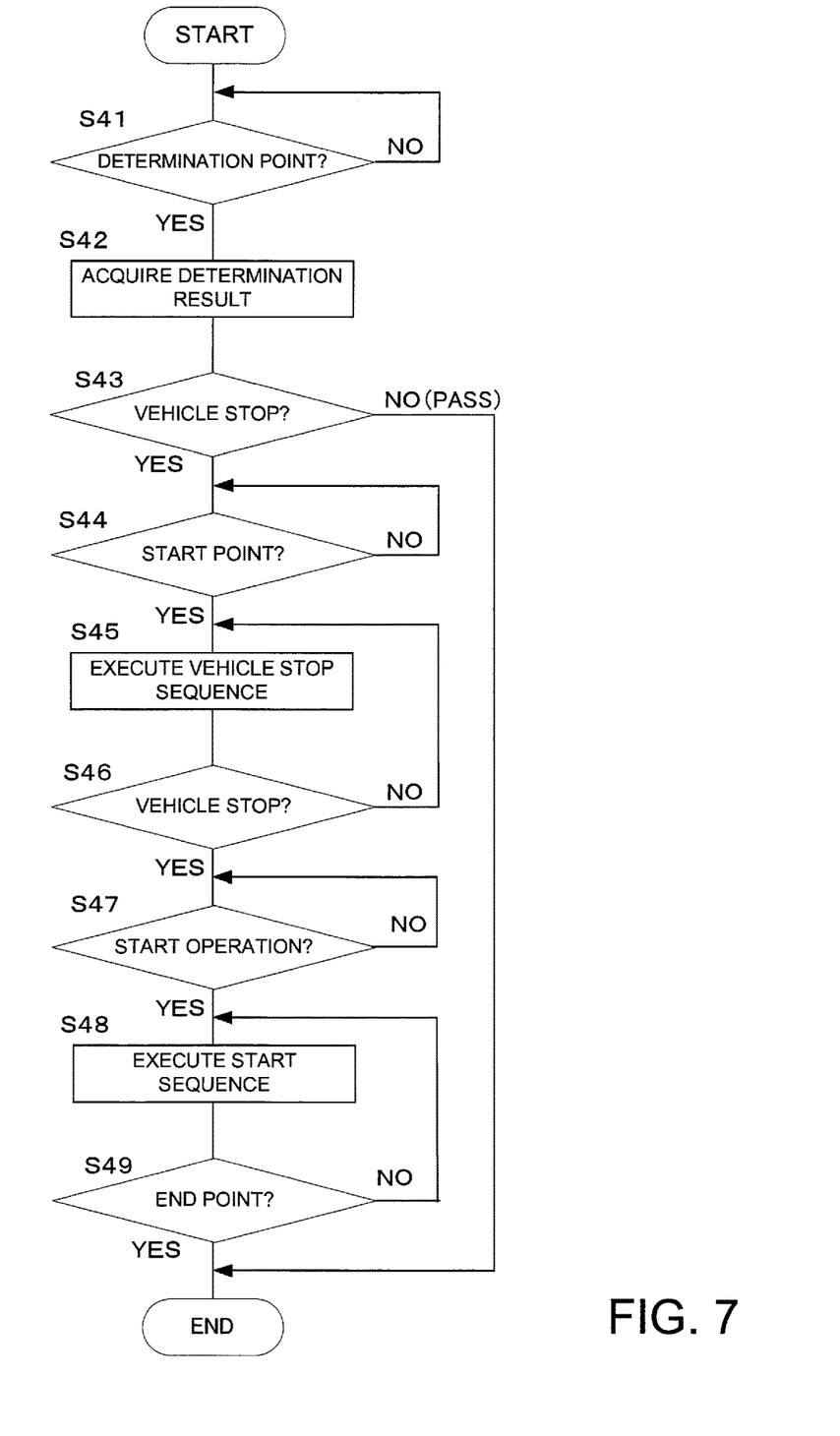
FIG. 7 is a flowchart of vehicle stop and start processing at the stopping place 52.

FIG. 7 is a flowchart of vehicle stop and start processing at the stopping place 52. First, it is determined whether the vehicle 10 reaches the vehicle stop/pass determination point (S41). Then, when reaching this determination point, the vehicle 10 requests the operation management center 12 for determination of vehicle stop/pass through communication, and acquires a determination result (S42). It is determined whether the determination result is vehicle stop or pass (S43), and in a case of vehicle pass, the processing for the vehicle stop at the stopping place is ended, and the vehicle 10 passes the stopping place 52.

In a case of vehicle stop in the determination of S43, it is determined whether the vehicle reaches the vehicle stop sequence start position at the predetermined distance before the stopping place 52 (S44). If YES in S44, the vehicle stop sequence is executed (S45). Consequently, the vehicle 10 stops at the stopping place. Then, it is determined whether the vehicle stops (S46), and in case of the vehicle stop, it is determined whether there is the start operation (e.g., the start button 36b is depressed) (S47). If YES in the determination of S47, the start sequence is executed (S48), for starting. Then, it is determined whether the vehicle reaches the start sequence end position (S49), and in a case where the end position is reached, the start sequence ends, and the stop and start control at the stopping place 52 ends.

The invention claimed is:

1. An automatic driving vehicle that is controlled by an operation management center, and has an automatic mode to automatically travel along a set travel route, the automatic driving vehicle being configured to:
receive an input to shift to the automatic mode, performed by an operator of the automatic driving vehicle, and after receiving the input, receive a travel start instruction from the operation management center, wherein:
the travel route has already been set when the automatic driving vehicle receives the travel start instruction, after receiving the travel start instruction, the automatic driving vehicle is placed in a start manipulation waiting state of waiting for a start manipulation by the operator, and in the start manipulation waiting state, in a case where the start manipulation is performed by the operator and a case where the start manipulation is not performed and a predetermined time elapses, start is performed to start travel along the set travel route in the automatic mode.

2. The automatic driving vehicle according to claim 1, wherein in the start manipulation waiting state, a stop holding state is provided, and in case of performing the start, the stop holding state is automatically canceled to perform the start.

3. The automatic driving vehicle according to claim 1, wherein in a case where the travel start instruction is received, information that the automatic vehicle is in the start manipulation waiting state is informed to the operator.

4. The automatic driving vehicle according to claim 2, wherein in a case where the travel start instruction is received, information that the automatic vehicle is in the start manipulation waiting state is informed to the operator.

5. The automatic driving vehicle according to claim 3, the information is informed after a confirmation input of receiving the travel start instruction is inputted by the operator.

6. The automatic driving vehicle according to claim 1, wherein at the start, a horn is sounded.

\* \* \* \* \*